Patented June 9, 1925.

1,541,156

UNITED STATES PATENT OFFICE.

GEORG KRÄNZLEIN, OF HOCHST-ON-THE-MAIN, PAUL NAWIASKY, OF LUDWIGSHAFEN-ON-THE-RHINE, MARTIN CORELL, OF HOCHST-ON-THE-MAIN, MAX ALBERT KUNZ, OF MANNHEIM, AND FRITZ SCHÜTZ, OF HOCHST-ON-THE-MAIN, GERMANY, ASSIGNORS TO BADISCHE ANILIN & SODA FABRIK, OF LUDWIGSHAFEN-ON-THE-RHINE, BAVARIA, GERMANY, A CORPORATION OF GERMANY.

BLUE INDANTHRENE DYESTUFF AND PROCESS OF MAKING THE SAME.

No Drawing.    Application filed July 31, 1922.    Serial No. 578,802.

*To all whom it may concern:*

Be it known that we, GEORG KRÄNZLEIN, PAUL NAWIASKY, MARTIN CORELL, MAX ALBERT KUNZ, and FRITZ SCHÜTZ, citizens, the first, third, and fifth of Germany, the second of Austria, and the fourth of Switzerland, residing, the first, third, and fifth at Hochst-on-the-Main, the second at Ludwigshafen-on-the-Rhine, and the fourth at Mannheim, Germany, have invented new and useful Improvements in Blue Indanthrene Dyestuffs and Processes of Making Same, of which the following is a specification.

It is known that by fusing beta-amino-anthraquinone with potassium hydroxid or mixtures of the latter with sodium hydroxid and afterwards treating the reaction product with alkaline reducing agents, such as hydrosulfite (see Patent 724,789), a blue vat dyestuff is obtained, the commercial name of which is indanthrene blue RS. Dyeings produced with said dyestuff have the property of giving greenish shades when treated with hydrochlorite, for instance, by treating for a quarter of an hour and at a temperature of 20 degrees centigrade with a dilute hypochlorite solution of a strength equivalent to one-fourth to one-half per cent of active chlorin. It is further known that by the action of halogenating agents, this dyestuff can be converted into blue dyestuffs containing halogen which differ from the first-named dyestuff by having a superior fastness to chlorin.

We have now found that a blue dyestuff free from halogen is obtained which possesses properties quite different from those of indanthrene blue RS when the working conditions are modified as described below. The new dyestuff excels the known dyestuff indanthrene blue RS chiefly by possessing a much better fastness to chlorin and also by giving dyeings of a much purer shade. It strongly differs from indanthrene blue RS in that a dyeing on cotton of 1 per cent of the new dyestuff remains blue when treated for a quarter of an hour at a temperature of 20 degrees centigrade with a dilute solution of hypochlorite of a strength equivalent to one-fourth to one-half per cent of active chlorin.

The new dyestuff is characterized by its being free from special impurities of an unknown character which are ordinarily present in the blue vat dye, and although their amount is apparently very small their presence results in rendering the dyestuff in which they are impurities not fast to chlorine, and a dyestuff which is free from such impurities may be produced in the following way:

We start, for instance, from a beta-amino-anthraquinone which has been prepared in a special way, fuse it with potassium hydroxid or a mixture of the latter with sodium hydroxid and subject the product obtained to a treatment with reducing agents, such as alkaline hydrosulfite solution. Said special beta-amino-anthraquinone must be free from certain impurities as to which it cannot be said whether or not they themselves or their conversion products formed in the alkali melt are fast to chlorin, which are, however, of a nature as to give rise upon fusion with alkali to substances which will render the blue vat dye produced from the amino-anthraquinone not fast to chlorin. A suitable beta-amino-anthraquinone may be obtained by treating beta-amino-anthraquinone with a mineral acid, for instance by dissolving it in concentrated sulfuric acid and adding so much of dilute sulfuric acid to this solution that pure beta-amino-anthraquinone sulfate is precipitated thereby but insufficient to cause the simultaneous precipitation of substances which upon fusion would give rise to bodies which will cause the dyestuff formed in the alkali melt not fast to chlorin. Instead of diluted sulfuric acid water may also be employed for precipitating. The sulfate of beta-amino-anthraquinone is separated from the liquid and decomposed by water and the pure beta-amino-anthraquinone is isolated and dried in the usual way. The operations described may be repeated. A suitable beta-amino-anthraquinone may also be obtained by treating beta-amino-anthraquinone with a moderately concentrated mineral acid and so extracting the undesirable impurities until the undissolved part, when fused with alkali, gives a product, dyeings of which on cotton remain blue when treated with a dilute solution of hypochlorite.

We can also obtain the new blue dyestuff by subjecting the commercial indanthrene blue RS, obtained by subjecting crude beta-amino-anthraquinone to the alkali melt, to a special treatment. It is, for instance, dissolved in concentrated sulfuric acid and sufficient water (preferably in the form of dilute sulfuric acid) is then added to cause the precipitation of the pure dyestuff but insufficient to cause also the precipitation of substances which cause the dyestuff to be not fast to chlorin. A dyestuff fast to chlorin of still more excellent properties is obtained by repeating this sulfuric acid treatment.

A dyestuff of equally valuable properties is also obtained by fusing a beta-amino-anthraquinone subjected to a purifying treatment as above described with caustic alkali and treating the dyestuff thus formed with sulfuric acid in the manner above described.

Example 1.

Crude beta-amino-anthraquinone is dissolved in 8 times its weight of sulfuric acid of 66 degrees Baumé, care being taken that the temperature does not surpass 35 degrees centigrade. The solution is then diluted, while stirring, with 4½ parts by weight of sulfuric acid of 50 degrees Baumé, the sulfate then beginning to separate out at once in the form of greyish-white scales from the solution which has a temperature of 60 degrees to 70 degrees centigrade. When cool, the crystalline paste is sucked off, converted into beta-amino-anthraquinone by decomposing with water, and dried. One part of the beta-amino-anthraquinone thus obtained is fused with 4 parts by weight of caustic alkali. The dyestuff obtained is dissolved in diluted alkaline solution of sodium hydrosulfite. After a short time, the dyestuff separates out in the form of its hydro compound which is filtered off, washed with a very dilute alkaline hydrosulfite solution and again converted into the new dyestuff by oxidation, as for instance with air.

Example 2.

1 part by weight of the dyestuff commercially known as indanthrene blue RS is introduced into 8 parts by weight of sulfuric acid of 66 degrees Baumé. Sulfuric acid of 60 degrees Baumé is added to the solution thus obtained in a restricted quantity so that the dyestuff precipitated thereby does not, practically speaking, contain any impurities causing it to be not fast to chlorin. About 3 parts by weight of sulfuric acid of 60 degrees Baumé will be sufficient.

Example 3.

1 part by weight of the dyestuff obtained according to example 1 is dissolved in 8 parts by weight of sulfuric acid of 66 degrees Baumé and fractionally precipitated with 4 parts by weight of sulfuric acid of 60 degrees Baumé.

We claim:

1. The process for the production of a new blue vat deystuff of the anthracene series, consisting in dissolving the blue vat dyestuff, obtained by subjecting beta-amino-anthraquinone to the caustic potash melt, in concentrated sulfuric acid, adding to this solution sufficient water to cause the precipitation of the dyestuff but insufficient to cause the precipitation of substances which cause the dyestuff to be not fast to chlorin.

2. The process for the production of a new blue vat dyestuff of the anthracene series, consisting in dissolving the blue vat dyestuff, obtained by subjecting beta-amino-anthraquinone to the caustic potash melt, in concentrated sulfuric acid, adding to this solution sufficient dilute sulfuric acid to cause the precipitation of the dyestuff but insufficient to cause the precipitation of substances which cause the dyestuff to be not fast to chlorin.

3. The process for the production of a new blue vat dyestuff of the anthracene series, consisting in fusing with caustic alkali a beta-amino-anthraquinone which is practically free from impurities which upon fusion give rise to bodies rendering the dye not fast to chlorin, dissolving the dyestuff obtained in concentrated sulfuric acid and fractionally precipitating it from the solution by carefully adding sufficient dilute sulfuric acid to precipitate pure dyestuff but insufficient to cause the precipitation of substances which cause the dyestuff to be not fast to chlorin.

4. The process for the production of a new blue vat dyestuff of the anthracene series, consisting in fusing with caustic alkali a beta-amino-anthraquinone which has been freed from substances which will give rise upon fusion to bodies which will cause the dyestuff to be not fast to chlorin, purifying the dyestuff by dissolving it in alkaline hydrosulfite solution and separating the hydro compound, retransforming the latter into the dyestuff, dissolving same in sulfuric acid and fractionally precipitating it with sufficient dilute sulfuric acid to precipitate pure dyestuff but insufficient to cause the precipitation of substances which cause the dyestuff to be not fast to chlorin.

5. A new blue vat dyestuff produced as hereinbefore described possessing the following characteristics: it is free from halogen and dyes cotton from the vat pure blue shades which in a strength of one per cent remain blue when treated for a quarter of an hour at a temperature of 20 degrees centigrade with a solution of sodium hypochlorite, the strength of which is equivalent to one-quarter to one-half per cent of active chlorin.

In testimony whereof we have hereunto set our hands.

GEORG KRÄNZLEIN.
PAUL NAWIASKY.
MARTIN CORELL.
MAX ALBERT KUNZ.
FRITZ SCHÜTZ.

Witnesses:
F. H. ANDERSON,
BASIL E. SAVARD.